US007886284B2

(12) United States Patent
Haven et al.

(10) Patent No.: US 7,886,284 B2
(45) Date of Patent: Feb. 8, 2011

(54) USING A BACKEND SIMULATOR TO TEST AND DEVELOP XFORMS TEMPLATES BEFORE LINKING THE XFORMS TEMPLATES TO BACKEND DATA PROCESSING SYSTEMS

(75) Inventors: Randy S. Haven, Raleigh, NC (US); Michael R. Wiegand, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 1191 days.

(21) Appl. No.: 11/470,015

(22) Filed: Sep. 5, 2006

(65) Prior Publication Data
US 2008/0126925 A1 May 29, 2008

(51) Int. Cl.
G06F 9/45 (2006.01)
G06F 9/445 (2006.01)

(52) U.S. Cl. .................... 717/138; 717/108; 717/114

(58) Field of Classification Search ......... 717/134–140, 717/104–108, 114–116
See application file for complete search history.

(56) References Cited

U.S. PATENT DOCUMENTS

| 5,481,712 A * | 1/1996 | Silver et al. ............... 717/109 |
| 5,911,072 A * | 6/1999 | Simonyi .................... 717/105 |
| 6,070,007 A * | 5/2000 | Simonyi .................... 717/106 |
| 6,216,159 B1 * | 4/2001 | Chintakrindi et al. ....... 709/220 |
| 6,233,583 B1 | 5/2001 | Hoth |
| 6,625,804 B1 * | 9/2003 | Ringseth et al. ............. 717/114 |
| 6,810,517 B2 * | 10/2004 | Bond et al. ................. 717/138 |
| 6,957,206 B2 | 10/2005 | Nolan |
| 6,996,800 B2 * | 2/2006 | Lucassen et al. ............ 717/106 |
| 7,050,955 B1 * | 5/2006 | Carmel et al. ................ 703/6 |
| 7,266,806 B2 * | 9/2007 | Choi et al. ................... 717/108 |
| 7,316,009 B2 * | 1/2008 | Peck .......................... 717/138 |
| 7,428,729 B2 * | 9/2008 | Hariharan et al. ........... 717/147 |
| 7,519,969 B2 * | 4/2009 | Bent et al. ................... 719/315 |
| 7,555,706 B2 * | 6/2009 | Chapman et al. ............ 715/234 |
| 7,676,356 B2 * | 3/2010 | Carmel et al. ................ 703/21 |
| 7,707,563 B2 * | 4/2010 | Wei ............................ 717/140 |
| 7,725,834 B2 * | 5/2010 | Bell et al. ................... 715/764 |
| 7,761,786 B2 * | 7/2010 | Betancourt et al. .......... 715/236 |
| 7,793,258 B2 * | 9/2010 | Sundararajan et al. ...... 717/109 |

(Continued)

OTHER PUBLICATIONS

Lee et al, "Automatic generation of Xforms code using DTD", IEEE ICIS, pp. 210-214, 2005.*

(Continued)

*Primary Examiner*—Anil Khatri
(74) *Attorney, Agent, or Firm*—Patents on Demand, P.A.; Brian K. Buchheit; Scott M. Garrett

(57) ABSTRACT

A solution for developing XForms projects can bind an XForms template to a backend simulator, during a development or test stage of a software development. The XForms template can be developed by an interface designer, such as a business analyst. The XForms template can be conveyed to remotely located clients. Data instances associated with the XForms template can be received and routed to the backend simulator for processing. An integration code developer can later integrate the XForms templates to a backend server instead of to the backend simulator. Accordingly, the solution accelerates XForms based development projects by decoupling XForms interface development from XForms system integration development, which are typically handled by different people having different skill sets.

18 Claims, 3 Drawing Sheets

U.S. PATENT DOCUMENTS

| | | |
|---|---|---|
| 2002/0010651 A1 | 1/2002 | Cohn et al. |
| 2002/0103737 A1 | 8/2002 | Briere |
| 2002/0178187 A1 | 11/2002 | Rasmussen et al. |
| 2004/0002907 A1 | 1/2004 | Tosswill |
| 2006/0010082 A1 | 1/2006 | Gee et al. |

OTHER PUBLICATIONS

Song et al, "An automated generation of Xforms interfaces for web services", IEEE ICWS, pp. 856-863, 2007.*

Lee et al, "Code generation of an Xfroms client for service integration", IEEE, pp. 75-80, 2008.*

Petropoulos et al, "XML query forms (XQForms) declerative specification of XML query interfaces", ACM WWW, 642-651, 2001.*

Lumley et al, "Configurable editing of XML based variable data documents", ACM DocEng, pp. 76-85, 2008.*

Boyer et al, "A REST protocol and composite format for interactive web documents", ACM DocEng, pp. 139-148, 2009.*

\* cited by examiner

USING A BACKEND SIMULATOR TO TEST AND DEVELOP XFORMS TEMPLATES BEFORE LINKING THE XFORMS TEMPLATES TO BACKEND DATA PROCESSING SYSTEMS

BACKGROUND

1. Field of the Invention

The present invention relates to the field of XForms technologies and, more particularly, to using a backend simulator to test and develop XForms templates before linking the XForms templates to backend data processing systems

2. Description of the Related Art

XForms is a markup language specified by the World Wide Web Consortium (W3C) that is based upon an Extensible Markup Language (XML). XForms separates data logic of a form from its presentation. Data logic is handled by an XForms model and presentation is handled by an XForms user interface. An XForms model holds instance data and associated constraints. Instance data is an internal representation of data of the XForms model. An XForms model can hold more than one data instance. In other words, the XForms model defines what a form is, what data a form should contain, and how the data of a form should be handled.

In XForms, presentation is handled by an XForms user interface or other compatible user interface, such as a XML user interface configured to interoperate with an XForms model. That is, an XForms user interface handles the display and input of data. XForms user interfaces are often referred to as XForms templates. It should be noted that the term "XForms template" shall be used generically throughout this application to represent any XForms compliant user interface.

An XForms binding mechanism binds an XForms model with a corresponding XForms template. An XForms Submit Protocol defines how XForms send and receive data between an XForms model and an XForms template. The XForms model is also bound to a backend application, which receives and processes instance data. Controls in an XForms template are often bound to the XForms model using XPath expressions, which can also bind the XForms model to the backend application.

XPath is a language that describes a way to locate and process items in XML documents by using an addressing syntax based on a path through the document's logical structure or hierarchy. XPath also provides basic facilities for manipulation of strings, numbers, and Booleans. XPath annotations or expressions can be attached to any node in an XForms data instance. Once attached to nodes, XPath expressions can provide a framework for supporting calculations, specific validations, read-only data, and visibility of controls. Accordingly, XPath expressions can be used to validate and otherwise process information input into an XForms template and to process data output to the XForms template.

Current technologies for generating XPath expressions and binding these expressions to controls within an XForms user interface are complex and cumbersome to use. Often, form designers lack the programmatic expertise to construct XPath expressions and to integrate them into forms being designed. This usually means that XForms user interfaces are initially designed by a form designer. A programming specialist is needed to construct and integrate XPath validations and other expressions to the user interfaces after initial form design activity has been completed. This process can add substantial time and/or cost to a form design effort.

To illustrate, a forms designer, such as a business analysis can initially develop an XForms template. A programming specialist will write code for the XForms model, which includes code that binds the XForms template to the XForms model and code that binds the XForms model to backend applications. The code can include XPath expressions. The XForms project can then be deployed to an XForms server, where remotely located clients can utilize the XForms project. Data submitted by the clients is conveyed to the bound backend application, even during testing phases. This testing data can be a data integrity risk for an operational system. Many man-hours of programmer time can also be consumed searching for and removing test information, which was received and processed by the backend applications. Whenever XForms templates are modified, corresponding modifications can be required for the XForms model, which can require coordination between the forms designer and programming specialist.

SUMMARY OF THE INVENTION

The present invention discloses a solution for decoupling XForms template development from XForms model development, which permits XForms templates to be tested on devices before binding an XForms project to a backend application. More specifically, the present invention permits an XForms template to be temporarily bound to a backend simulator. This binding to the backend simulator can be facilitated by a software development tool. Once an XForms project has been fully developed and tested using the backend simulator, a programmatic specialist can construct an XForms model that binds the XForms template to a data instance, which is also bound to a real backend application.

The solution can allow a forms designer to iteratively develop and test XForms templates without needing access to backend applications. This prevents the backend applications from becoming corrupted with test data. The solution also permits the forms designer to operate independent of a programmatic specialist responsible for binding the XForms template to backend applications, which can save considerable software development time and expenses.

The present invention can be implemented in accordance with numerous aspects consistent with material presented herein. For example, one aspect of the present invention can include a method for developing XForms projects. The method can bind an XForms template to a backend simulator during a development or test stage of a software development. The XForms template can be developed by an interface designer, such as a business analyst. The XForms template can be conveyed to remotely located clients. Data instances associated with the XForms template can be received and routed to the backend simulator for processing. An integration code developer can later integrate the XForms templates to a backend server instead of to the backend simulator. Accordingly, the solution accelerates XForms based development projects by decoupling XForms interface development from XForms system integration development, which are typically handled by different people having different skill sets.

Another aspect of the present invention can include a method for developing XForms based software projects. In the method, a software development tool can be made available to an interface designer, who develops XForms templates. The software development tool can permit developed XForms templates to be automatically bound to a backend simulator without a human software designer creating code specific to the XForms templates. The XForms templates that are bound to the backend simulator can be deployed to an XForms server. The XForms server can route client supplied data associated with the deployed XForms templates to the backend simulator.

Yet another aspect of the present invention can include an XForms software development tool that includes a backend simulator for XForms templates. The backend simulator can be configured to receive and process input from clients using the XForms templates before the XForms templates are bound to a backend server.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, any other recording medium, or can also be provided as a digitally encoded signal conveyed via a carrier wave. The described program can be a single program or can be implemented as multiple subprograms, each of which interact within a single computing device or interact in a distributed fashion across a network space.

The method detailed herein can also be a method performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
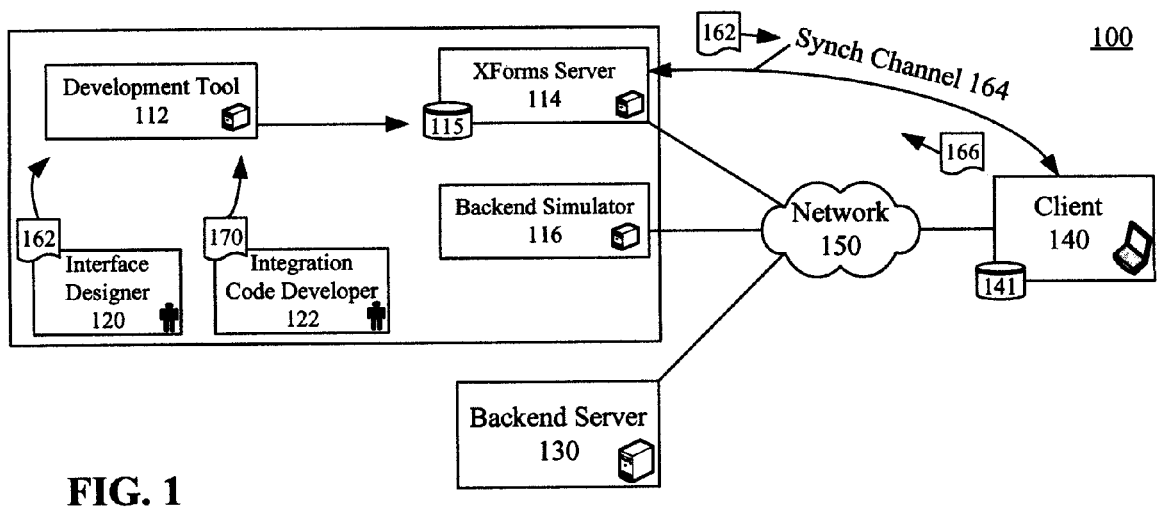
FIG. 1 is a schematic diagram for a system that accelerates a development of XForms applications by decoupling XForms templates from backend data processing systems during interface development and interface testing phases of an XForms project.

FIG. 1 is a schematic diagram for a system 100 that accelerates a development of XForms applications by decoupling XForms templates from backend data processing systems during interface development and interface testing phases of an XForms project.

In system 100, development tools 112 can be used to develop an XForms project. During development, an interface designer 120 can create an XForms template 162, which is bound to a backend simulator 116 instead of a backend server 130. The development tool 112 can automatically create an XForms data instance for the template 162, which is compatible with the backend simulator 116.

In one embodiment, the development tool 112 can permit the designer 120 to include customize software stubs, which are designed in a manner compatible with the backend simulator 116. For example, the interface designer 120 can use the stubs to specify data validation and/or processing logic that can be used during system development and testing. Ultimately, any logic specified in the stubs will be replaced by logic included in XForms model code 170, such as code that contains XPath expressions. The XForms model code 170 can be linked to the backend server and can bind presentation elements in the XForms template 162 to model defined data elements, which are in turn bound to the backend server 130.

The development tool 112 can deploy the XForms template 162 to a forms repository 115. The forms repository 115 can be accessed by a forms manager of an XForms server 114. The XForms server 114 can administer or serve one or more XForms to one or more clients 140. A synchronization channel 164 can be established between XForms server 114 and client 140. In one configuration, the synchronization channel 164 can conform to an XForms Submit Protocol. The client 140 can use client data store 141 that contains client specific form information. Data store 141 can be synchronized with repository 115 during the synchronization process, which makes new XForms added to data store 114 since the last synchronization operation available to client 140. For example, XForms template 162 can be conveyed to the client 140 when data store 141 is synchronized with repository 115.

Client 140 can open the XForms template 162 using a client application, such as an XForms compliant browser. A user of client 140 can input requested data into a form and thereafter submit a data instance 166 that includes the input. The data instance 166 can be conveyed to server 114. XForms server 114 can receive the submitted data and route it to the backend simulator 116. The backend simulator 116 can process the input and optionally generate a response. The response can be presented within client 140 after being conveyed through server 114 via network 150.

The interface designer 120 can iteratively alter the XForms template 162 during a testing stage. Each alteration can be linked to the backend simulator 116, and can be presented to client 140. Once the interface designer 120 is satisfied with the XForms template, the integration code developer 122 can design and/or modify the XForms model 170, so that the model binds the XForms template elements to data elements and binds the data elements to the backend server. The XForms template 162 bound to the XForms module 170 can be deployed to the forms repository 115. Thereafter, when the client 140 submits a data instance 166 for the XForms template 162, the XForms server 114 can route the data instance 166 to the backend server 130 in accordance with code contained in the XForms module 170.

Client 140 can include any computing device capable of rendering an XForms compliant document. Since the XForms language is specifically designed to bifurcate data presentation from data logic, the XForms presentation or XForms template 162 can be one specifically tailored to the capabilities of client 140. For example, different XForms interfaces can be used for a client 140 which is a personal data assistant (PDA) or a smart phone than for a client 140 which is a desktop computer. Each of the specifically tailored templates 162 can be developed and tested by the interface designer 120 without requiring a level of interaction between the designer 120 and developer 122 that is needed for an XForms development system, which lacks the backend simulator 116.

Repository 115 and data store 141 can be physically implemented within any type of hardware including, but not limited to, a magnetic disk, an optical disk, a semiconductor memory, a digitally encoded plastic memory, a holographic memory, or any other recording medium. Each of repository 115 and data store 141 can be stand-alone storage units as well as a storage unit formed from a plurality of physical devices, which may be remotely located from one another. Additionally, information can be stored within each of repository 115 and data store 141 in a variety of manners. For example, information can be stored within a database structure or can be stored within one or more files of a file storage system, where each file may or may not be indexed for information searching purposes.

Network 150 can be used to communicatively link different components of system 100 to one another. Network 150 can include any hardware/software/and firmware necessary to convey data encoded within carrier waves. Network 150 can include one or more personal area network (PAN), local area network (LAN), metropolitan area network (MAN), wide area network (WAN), virtual private network (VPN), and the like. Network 150 can also include local components and data pathways necessary for communications to be exchanged among computing device components and between integrated device components and peripheral devices. The network 150 can include line based and/or wireless communication pathways.

Figure 2:
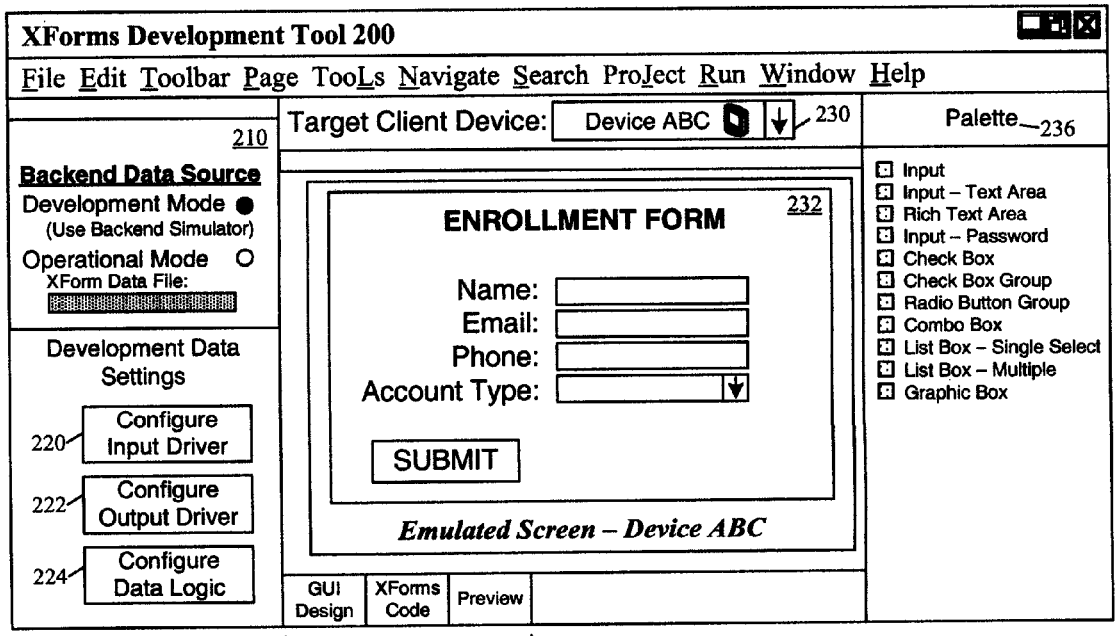
FIG. 2 is a sample Graphical User Interface (GUI) of a software design interface for an XForms interface tool permitting XForms templates to utilize a backend simulator in accordance with an embodiment of the inventive arrangements disclosed herein.

FIG. 2 is a sample GUI 200 of a software design interface for an XForms interface tool permitting XForms templates to utilize a backend simulator in accordance with an embodiment of the inventive arrangements disclosed herein. GUI 200 is an XForms development interface, which can be used by the interface designer 120 to develop template 162. The GUI 200 can be an interface of the development tool 112.

GUI 200 can include a section 210 that provides a user selectable option for a backend data source. Section 210 can permit an interface designer to utilize a development mode, which binds an XForms template to a backend simulator component, or to select an operational mode, where an XForms model can be linked to the XForms template. In the operational mode, a user can specify a data file for the XForms model, which is to be associated with the XForms template.

In one embodiment, a user can specify various data settings 220-224 that are to be used when operating in the development mode. These settings 220-224 can adjust the behavior of the background simulator to approximate behavior which will be experienced when the XForms template is associated with the XForms model. For example, a designer can configure an input driver 220, which can be used to perform input validation operations. An output driver 222 can be configured to simulate output that a backend server generates when an XForms model is used instead of the backend simulator. Further, data logic 224 can be configured for the backend simulator to simulate logic of the backend server.

In a particular embodiment, GUI 200 can be part of an integrated design tool, which an integration code developer uses to develop the XForms model and to link the model to the XForms template. Then settings 220-224 provided by the form designer and used for testing the XForms template can be automatically applied by the development tool to the XForms model. That is, XForms model code can be automatically generated, which can be further edited by the code developer, based upon the settings 220-224, which can save the code developer time and can ensure the operational XForms template behaves in a tested manner after integration with the XForms model occurs.

GUI 200 can optionally include a visual development environment for designing XForms. For example, GUI 200 can represent an interface of INTERNATIONAL BUSINESS MACHINE CORPORATION's (IBM's) VISUAL XFORMS DESIGNER for ECLIPSE. The visual interface can include a palette 236 of template elements that can be placed upon a development canvas 232. In one embodiment, numerous device emulators 230 can be selected. Canvas 232 properties can be adjusted in accordance with properties of the emulated device. For example, a designer can select an emulator 230 for Device ABC, which causes the properties of canvas 232 to match those of the emulated device. Thus, different mobile telephones, desktops, embedded devices, and other interfaces can be selected by the template designer, depending upon a target presentation platform of the template being created. Various canvas views 234 can be selected for GUI 200, such as a GUI design view, an XForms code view, and an interactive preview.

It should be appreciated that the GUI 200 is provided for illustrative purposes only and that the invention can be implemented in any of a variety of ways other than those illustrated in GUI 200. Use of alternative and derivative display elements, input field types, menus, tabs, windows, and the like are contemplated herein. Additionally, although a graphical interface is shown, the concepts expressed by GUI 200 can be implemented within an interactive speech interface, a multimodal interface, a three-dimensional interface, and the like, by one of ordinary skill in the art without undue experimentation using techniques known in the art.

Figure 3:
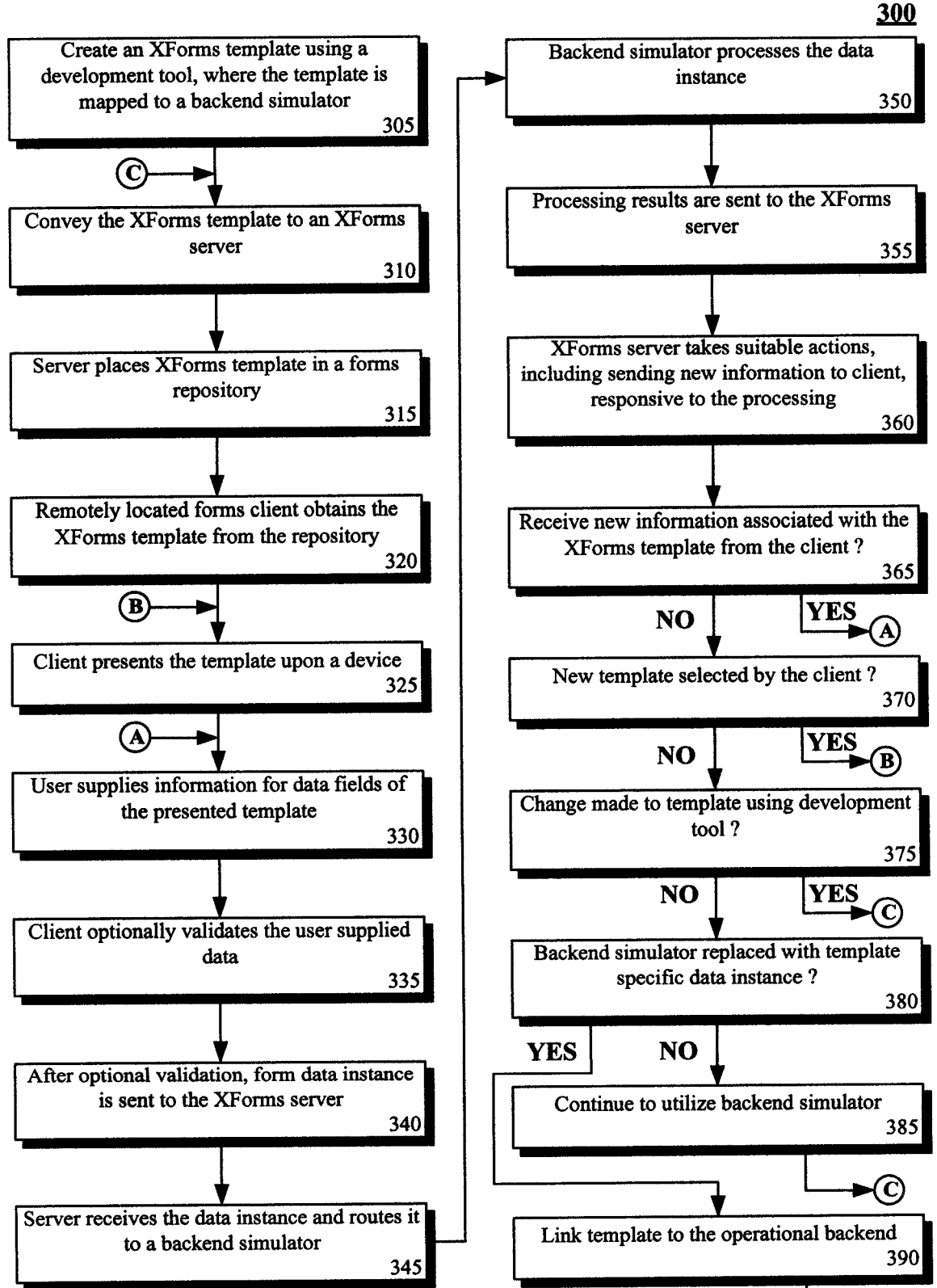
FIG. 3 is a flow chart of a method for utilizing an XForms backend simulator in accordance with an embodiment of the inventive arrangements disclosed herein.

FIG. 3 is a flow chart of a method 300 for utilizing an XForms backend simulator in accordance with an embodiment of the inventive arrangements disclosed herein. Method 300 can be performed in the context of a system 100. Method 300 is not to be construed as limited to exact details of system 100, but can instead be implemented for any system that permits an XForms template to be interactively deployed to XForms clients before the template is bound to an operational data backend system.

Method 300 can begin in step 305, where an XForms template can be created using a software development tool. The XForms template can be a template created by a business analyst or GUI developer. The template can be automatically mapped to a backend simulation component, which is used in lieu of an XForms model, which may not yet be implemented. In step 310, the XForms template can be conveyed to an XForms server. In step 315, the XForms server can place the XForms template in a forms repository. In step 320, a remotely located forms client can obtain the XForms template from the forms repository.

In step 325, the client can present the XForms template to a user. The presentation can utilize an XForms compliant client application, from which a user selects the XForms template. In step 330, a user can supply information for data fields of the presented XForms. In step 335, the client can optionally validate the user supplied data. In one embodiment, validation can be performed based upon settings established using the software development tool. In step 340, after the optional validation, a form data instance that includes the user supplied data can be sent from the XForms client to the XForms server.

In step 345, the XForms server can receive the data instance and can route the data instance to the backend simulator. In step 350, the backend simulator can process the data instance. In step 355, processing results can be sent to the XForms server. In step 360, the XForms server can take suitable actions responsive to the processed data. For example, the XForms server can send a new form to the client that includes data processing results.

In step 365, the method can determine whether additional user input for the XForms is available. If so, the method can loop to step 330, where the user can supply the information to the client, which validates the user information, and conveys it to the XForms server. When no additional user input is available, the method can progress to step 370, where a check for a different XForms template can be performed. If a user of the client has attempted to obtain a different XForms template, the method can loop to step 325, where the user can select a different template from the repository.

Otherwise, the method can progress to step 375, where a template designer may change the XForms template. For example, if the interface designer is unsatisfied with a manner in which the XForms template was presented in the client, the designer can make a change to correct a perceived deficiency. If a change is made, the method can loop from step 375 to step 310, where the modified XForms template can be conveyed to the XForms server.

If no change is to be made to the XForms template, it can be assumed that the template behaved in a desired manner when tested upon the XForms client, which can end the development and/or initial testing phase for an XForms project. The next phase can include mapping the XForms template to an operational backend system. In step 380, a decision can be made as to whether the backend simulator is to be replaced with an XForms model. If not, the method can proceed to step 385 where additional testing or development efforts can be performed using the XForms template that is linked to the backend simulator. If the replacement is to occur in step 380, the real data source can be coupled to the Form Template in place of the backend simulator, as shown by step 390. Either way, any change to the XForms project can be conveyed to the XForms server, as shown by the method looping from steps 385 and 390 back to step 310.

Figure 4:
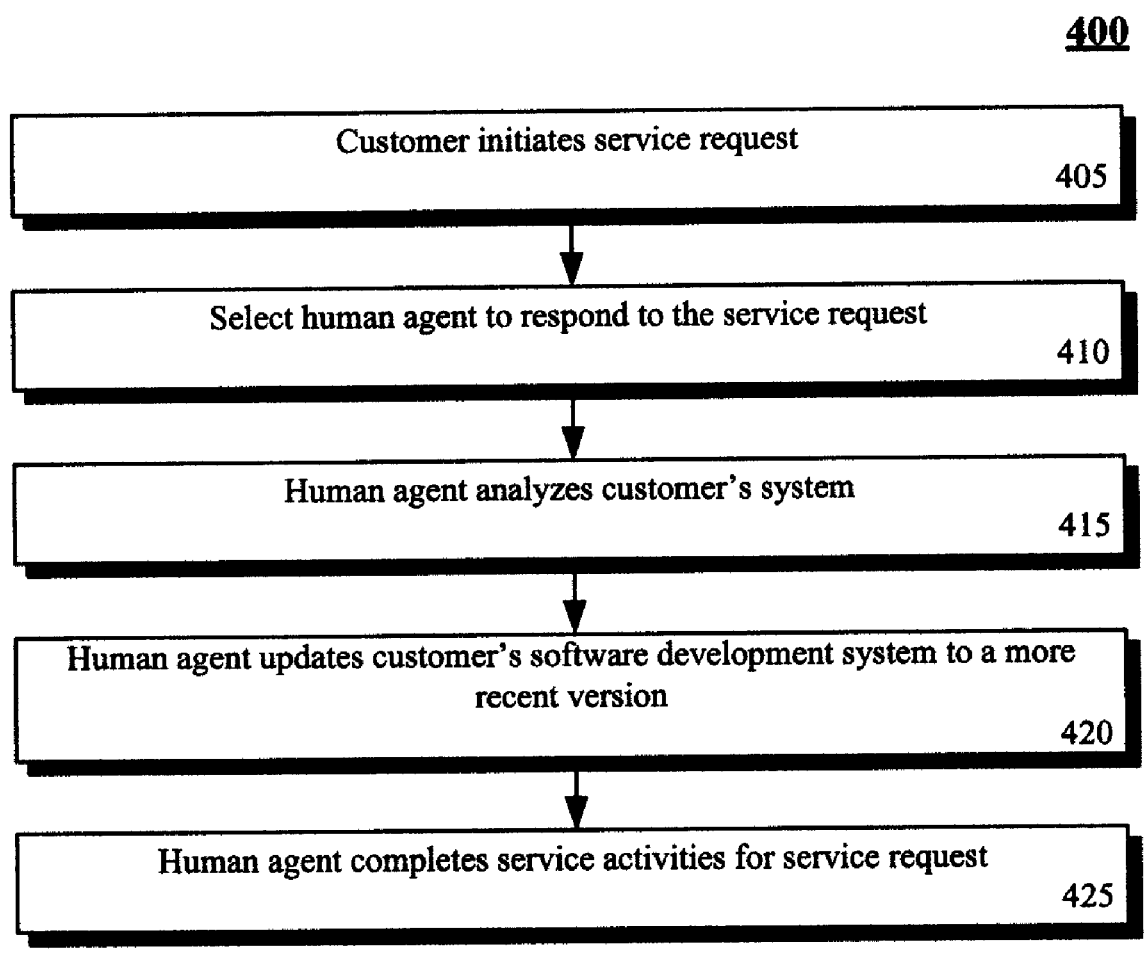
FIG. 4 is a flow chart of a method where a service agent can configure a system that permits XForms development to occur in accordance with an embodiment of the inventive arrangements disclosed herein.

FIG. 4 is a flow chart of a method 400 where a service agent can configure a system that permits XForms development to occur in accordance with an embodiment of the inventive arrangements disclosed herein. Method 400 can be preformed in the context of system 100 or a method 300.

Method 400 can begin in step 405, when a customer initiates a service request. The service request can be a request for a service agent to install an XForms development tool, which has a backend simulator capability. The service request can also be a request to troubleshoot an existing system, to train personnel to use a software development system, and the like. In step 410, a human agent can be selected to respond to the service request. In step 415, the human agent can analyze a customer's current system and information needs and can develop a solution. In step 420, the agent can implement the solution. For example, the human agent can update a customer's software development system to a more recent version than that which the customer previously used. In step 425, the human agent can complete service activities for the service request.

It should be noted that while the human agent may physically travel to a location local to adjust the customer's computer or application server, physical travel may be unnecessary. For example, the human agent can use a remote software agent to remotely manipulate the customer's computer system.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

What is claimed is:

1. A method for developing XForms interfaces comprising:
   in at least one of a development or test stage, binding, via computing equipment controlled by a program stored in a non-transitory storage medium, an XForms template to a backend simulator;
   conveying, via computing equipment controlled by a program stored in a non-transitory storage medium, the XForms template to remotely located clients;
   receiving, via computing equipment controlled by a program stored in a non-transitory storage medium, data instances associated with the XForms template from the remotely located clients; and
   routing, via computing equipment controlled by a program stored in a non-transitory storage medium, the data instances to the backend simulator for processing; after the XForms template has been tested, binding, via computing equipment controlled by a program stored in a non-transitory storage medium, the XForms template to an XForms model, wherein the XForms model binds the data instances to a backend server, wherein after the binding of the XForms template with the XForms model, data instances received from clients are routed to the backend server instead of being routed to the backend simulator; and deploying, via computing equipment controlled by a program stored in a non-transitory storage medium, the XForms template bound to the backend simulator to an XForms repository associated with an XForms server; and
   said remotely located clients receiving the XForms template responsive to synchronizing with the XForms server.

2. The method of claim 1 further comprising:
   binding, via computing equipment controlled by a program stored in a non-transitory storage medium, the XForms template to a backend server instead of to the backend simulator, before an operational stage, wherein during the operational stage, user input provided in fields of the XForms template is conveyed to the backend server.

3. The method of claim 2, wherein the method is used as part of an XForms design project, wherein an XForms interface designer creates and tests the XForms template using the backend simulator, and wherein an integration code developer creates code to bind the XForms template to the backend server.

4. The method of claim 1, wherein the XForms template is designed by an interface designer, who uses a software development tool to automatically bind the XForms template to the backend simulator, wherein the backend simulator is a component provided with the software development tool.

5. The method of claim 4, wherein the software development tool includes a visual user interface for a development of software projects conforming to XForms compliant standards, wherein said visual user interface permits XForms templates to be created by visually dropping interface control elements upon a canvas of the visual user interface.

6. The method of claim 5, wherein the software development tool includes a selection element for automatically binding an XForms template to the backend simulator, wherein the automatic binding occurs without a human software designer creating code specific to the XForms template.

7. The method of claim 4, wherein the software development tool conforms to a standard compliant with an ECLIPSE MODELING FRAMEWORK (EMF).

8. The method of claim 1, wherein the XForms server comprises the backend simulation component.

9. The method of claim 1, further comprising:
binding, via computing equipment controlled by a program stored in a non-transitory storage medium, the XForms template to an XForms model, wherein the XForms model binds the data instance to a backend server;
conveying, via computing equipment controlled by a program stored in a non-transitory storage medium, an XForms template newly bound to the XForms model to the XForms repository;
responsive to a synchronization action, conveying, via computing equipment controlled by a program stored in a non-transitory storage medium, the newly bound XForms template to remotely located clients;
the XForms server receiving data instances associated with the newly bound XForms template from the remotely located clients; and
the XForms server routing the data instances from the receiving of data instances associated with the newly bound XForms template to the backend server for processing.

10. The method of claim 1, wherein said steps of claim 1 are steps performed automatically by at least one machine in accordance with at least one computer program having a plurality of code sections that are executable by the at least one machine.

11. The method of claim 1, wherein the steps of claim 1 are performed by at least one of a service agent and a computing device manipulated by the service agent, the steps being performed in response to a service request.

12. A method for developing XForms based software projects comprising:
providing, via computing equipment controlled by a program stored in a non-transitory storage medium, a software development tool to an interface designer to develop XForms templates, wherein said software development tool permits developed XForms templates to be automatically bound to a backend simulator without a human software designer creating code specific to the XForms template; and
deploying, via computing equipment controlled by a program stored in a non-transitory storage medium, XForms templates bound to the backend simulator to an XForms server, which routes client supplied data associated with the deployed XForms templates to the backend simulator; after the XForms template has been tested, binding, via computing equipment controlled by a program stored in a non-transitory storage medium, the XForms template to an XForms model, wherein the XForms model binds the data instances to a backend server, wherein after the binding of the XForms template with the XForms model, data instances received from clients are routed to the backend server instead of being routed to the backend simulator; and deploying, via computing equipment controlled by a program stored in a non-transitory storage medium, the XForms template bound to the backend simulator to an XForms repository associated with an XForms server; and said remotely located clients receiving the XForms template responsive to synchronizing with the XForms server.

13. The method of claim 12 further comprising:
after the deploying step, an integration code developer binding, via computing equipment controlled by a program stored in a non-transitory storage medium, at least one of the XForms templates to a backend server; and
deploying, via computing equipment controlled by a program stored in a non-transitory storage medium, the server-bound XForms template to the XForms server, which thereafter routes client supplied data associated with the server-bound XForms template to the backend server.

14. The method of claim 13, wherein the interface designer and the integration code developer are different people.

15. A computer program product stored in a non-transient storage medium, wherein said computer program product is referred to as an XForms software development tool comprising:
a backend simulator for XForms templates, wherein the backend simulator is configured to receive and process input from clients using the XForms templates before the XForms templates are bound to a backend server; after the XForms template has been tested, binding, via computing equipment controlled by a program stored in a non-transitory storage medium, the XForms template to an XForms model, wherein the XForms model binds the data instances to a backend server, wherein after the binding of the XForms template with the XForms model, data instances received from clients are routed to the backend server instead of being routed to the backend simulator; and deploying, via computing equipment controlled by a program stored in a non-transitory storage medium, the XForms template bound to the backend simulator to an XForms repository associated with an XForms server; and said remotely located clients receiving the XForms template responsive to synchronizing with the XForms server.

16. The computer program product of claim 15, further comprising:
a visual user interface for a development of software projects conforming to XForms compliant standards, wherein said visual user interface permits XForms templates to be created by visually dropping interface control elements upon a canvas of the visual user interface.

17. The computer program product of claim 16, further comprising:
a selection element for automatically binding an XForms template to the backend simulator, wherein the automatic binding occurs without a human software designer creating code specific to the XForms template.

18. The computer program product of claim 16, wherein the backend simulator is integrated with an XForms server.

* * * * *